United States Patent
Legrand et al.

(10) Patent No.: US 6,539,071 B1
(45) Date of Patent: Mar. 25, 2003

(54) FREQUENCY CORRECTION AT THE RECEIVER END IN A PACKET TRANSMISSION SYSTEM

(75) Inventors: Delphine Legrand, Paris (FR); Americo Brajal, Villeneuve-le-Roi (FR); Antoine Chouly, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 288 days.

(21) Appl. No.: 09/678,966

(22) Filed: Oct. 4, 2000

(30) Foreign Application Priority Data

Oct. 13, 1999 (FR) .......................................... 99 12781

(51) Int. Cl.[7] .......................... H04L 7/00; H04L 27/22; H03D 3/22
(52) U.S. Cl. ........................ 375/355; 375/333; 375/367
(58) Field of Search ................................. 375/355, 365, 375/333

(56) References Cited

U.S. PATENT DOCUMENTS

| | | | | |
|---|---|---|---|---|
| 4,937,841 A | * | 6/1990 | Chuang et al. | 375/340 |
| 5,151,926 A | * | 9/1992 | Chennakeshu et al. | 375/333 |
| 5,852,641 A | * | 12/1998 | Hagmanns | 375/356 |
| 6,181,755 B1 | * | 1/2001 | Junell | 375/362 |
| 6,400,784 B1 | * | 6/2002 | Ben-Eli | 375/365 |

OTHER PUBLICATIONS

Morelli et al, Data–Aided Frequency Estimation for Burst Digital Transmission, IEEE, pp 23–25,1997.*
Morelli et al , Further Results in Carrier Frequency Estimation for Transmissions Over Flat Fading Channels, IEEE, pp 327–330.*
Y.V. Zakharov Et Al, "Frequency Estimator with Dichotomous Search of Periodogram Peak", Electronic Letters, Sep. 16, 1999, vol. 35, No. 19, pp. 1608–1609.

* cited by examiner

*Primary Examiner*—Mohammad H. Ghayour
*Assistant Examiner*—Tony Al-Beshrawi
(74) *Attorney, Agent, or Firm*—Russell Gross

(57) ABSTRACT

The invention relates to a system for transmitting packets from interactive terminals to a head station. The terminals intended for consumers are provided with local oscillators which are not very accurate and use carriers having frequency errors which are relatively large with respect to the theoretical reference value (Fp). The invention provides an improvement of the reception of signals having such a frequency shift at the receiver end. To this end, the invention provides a method of estimating the frequency error $\Delta\hat{f}$, which consists of rapidly obtaining the maximum value of a discrete error function denoted $Z(\Delta\hat{f})$ for a given accuracy (Acc) by computing the function $Z(\Delta\hat{f})$ for a minimal number of points.

7 Claims, 2 Drawing Sheets

FREQUENCY CORRECTION AT THE RECEIVER END IN A PACKET TRANSMISSION SYSTEM

BACKGROUND OF THE INVENTION

1. Field of the Invention

The invention relates to a packet transmission system comprising at least a terminal and a head station, the head station comprising means for receiving packets of data transmitted by said terminal with a frequency error $\Delta f$, and error estimation means for computing, on the basis of the received data, a discrete error function $Z(\Delta \hat{f})$ and for deriving an estimation $\Delta \hat{f}$ of the frequency error corresponding to a maximum value of the error function $Z(\Delta \hat{f})$ for a given accuracy (Acc).

The invention also relates to a receiver for a packet transmission system intended to receive packets of data transmitted by a terminal with a frequency error $\Delta f$ and comprising error estimation means for computing, on the basis of the received data, a discrete error function $Z(\Delta \hat{f})$ and for deriving an estimation $\Delta \hat{f}$ of the frequency error corresponding to a maximum value of the error function $Z(\Delta \hat{f})$ for a given accuracy (Acc).

The invention further relates to a method of frequency correction at the receiver end for a packet transmission system, comprising a step of receiving packets of data from at least one terminal of said system, an error estimation step for computing, on the basis of the received data, a discrete error function $Z(\Delta \hat{f})$ and for deriving a frequency error estimation $\Delta \hat{f}$ relative to the data received and corresponding to a maximum value of the error function $Z(\Delta \hat{f})$ for a given accuracy (Acc).

The invention finds important applications, notably in the field of cable or satellite transmissions with return paths in which a plurality of terminals can transmit data packets to a head station in accordance with a frequency and time division mechanism. Such transmissions from terminals to the head station are referred to as ascending transmissions.

These terminals are generally intended for the consumer. It is thus important to reduce their cost price. To this end, it is advantageous to use low-cost local oscillators which are, however, relatively inaccurate, for generating the carrier frequencies to be used in the ascending transmissions. Typically, the oscillators used have an accuracy varying between 1 ppm (part per million) and 10 ppm. The error resulting in the generated carrier frequency is proportional to the carrier frequency and is larger as the frequencies used are higher. By way of example, in the satellite transmission systems using the frequency band Ka (20 GHz–30 GHz) for the ascending transmissions, the width or frequency error observed for a local oscillator having an accuracy of 1 ppm may reach ±30 kHz (i.e. for a symbol frequency of 100 kHz, the standard frequency width with respect to the symbol frequency is ±30%).

2. Description of Related Art

The article "Frequency estimator with dichotomous search of periodogram peak" by Y. V. Zakharov and T. C. Tozer, published in the magazine Electronics Letters, vol. 35, no. 19, Sep. 16, 1999, describes a frequency estimator which is based on an algorithm named after its authors Rife and Boorstyn for estimating a frequency error in a frequency range which is standardized with respect to the symbol frequency $\Delta f/B$ of $\pm \frac{1}{2}$ (where $\Delta f$ is the frequency error and B is the symbol frequency). In the description hereinafter, the estimation of the standard frequency width $\Delta f/B$ or $\Delta f \times T_s$ (where $T_s$ is the duration symbol) which is to be determined will be denoted $\Delta \hat{f}$. The received data are modulated in accordance with a modulation of the PSK (Phase Shift Keying) type for forming symbols.

The estimators are characterized by different parameters, notably by the accuracy of the obtained estimation which is denoted Acc, the magnitude of the acquisition range of the frequency width denoted $\pm \Delta f_{max}$, the minimum level with respect to the signal-to-noise ratio of the treated signal, and the complexity of the algorithm. Certain parameters have opposite evolutions. Particularly the accuracy of the estimation is less as the acquisition range is larger; and the estimators are more complex as they are capable of functioning at lower signal-to-noise ratios. Rife and Boorstyn have shown that the frequency error $\Delta f$ has a maximum probability of being situated at the location of the maximum amplitude of the following function, denoted $Z(\Delta \hat{f})$:

$$Z(\Delta \hat{f}) = \frac{1}{L}\sum_{k=0}^{L-1} z(k) \times e^{-j2\pi k \Delta \hat{f}} \qquad (1)$$

wherein L is the length of observation, i.e. the number of received symbols used for computing the error estimation, and k represents the position of the symbol in the received frame, with $z(k)=x(k) \times c_k^*$ if the received symbols are known, where $c_k^*$ is the conjugated complex of the known predetermined symbol $c_k$ and where $x(k)$ is the symbol received with a frequency error $\Delta f$ and is written as $x(k)=c_k \times e^{2\pi j \cdot k \Delta f \times T_s + j\phi_0}$ where $\phi_0$ is the initital phase shift between the local oscillator used at the receiver end and that used at the transmitter end (this phase shift is different for each packet and corresponds to the phase shift for k=0) and with $z(k)=e^{jM \; arg|x(k)|}$ if the received symbols are not known in advance, where M is the number of PSK modulation phases used but in which case the result obtained must be divided by M so as to obtain the estimation $\Delta \hat{f}$.

The technique proposed in the cited article recommends an error estimation in two steps, a first step in which a first error estimation is obtained by computing a Fast Fourier Transform (FFT) for a certain number of points in each standard interval $\pm \frac{1}{2}$, and a second step in which successive iterations of error computations are performed for searching the maximum value of the error function in accordance with a dichotomous method by starting from three adjacent points roughly representing of the maximum location. This technique implies that the points are computed in all intervals of acquisition of the standard frequency width $\pm \frac{1}{2}$ for obtaining the first estimation. In the case of an estimation only using a preamble of predefined data in each received packet for effecting the estimation, currently referred to as DA (Data Aided), the time of acquisition of the error is very limited. It is also preferable to limit the computing power required at the level of the network head by limiting the number of computations. However, this method does not allow adaptation of the number of computations to the real performance of the local oscillators used in the terminals.

SUMMARY OF THE INVENTION

It is an object of the invention to remedy these drawbacks by proposing a system, a receiver and a frequency correction method with which the reception of data packets having a large frequency shift can be improved by limiting the number of computations to a maximum by taking the real performance of the terminals used in the system into account. To this end, a transmission system and a receiver according to the invention as described in the opening paragraph are characterized in that the error correction means comprise iteration means for effecting a first iteration of the computation of the error function $Z(\Delta \hat{f})$ for 2N+1 error values comprised in a fixed standard range $\pm \Delta f_{max}$ dependent on said terminal for deriving a first frequency error estimation ($\Delta \hat{f}(i)$), and successive iterations for values comprised between the current estimation previously calculated, and a neighboring value for which the error function $Z(\Delta \hat{f})$ has the largest amplitude, until a predetermined number of iterations (it) related to the accuracy (Acc) is obtained by means of the relation (2):

$$Acc = \frac{\Delta f_{max}}{N \times 2^{it-1}} \quad (2)$$

The terminals which are currently on the market and are used in the interactive transmission systems generally have a frequency error comprised in a maximum error range denoted $\pm \Delta f_0/B$ (where B is the symbol frequency) comprised in the interval $\pm \frac{1}{2}$. By computing the function $Z(\Delta \hat{f})$ in an error range $\pm \Delta f_{max}/B$, with $\frac{1}{2} > \Delta f_{max}/B > \Delta f_0/B$, the invention prevents computation of all the points comprised in the intervals $[-\frac{1}{2}; -\Delta f_{max}/B]$ and $[\Delta f_{max}/B; \frac{1}{2}]$ which are remote from the real error. The invention recommends a first iteration of the function $Z(\Delta \hat{f})$ for 2N+1 points comprised in the range $\pm \Delta f_{max}/B$, where N is an integer chosen in such a way that $\Delta f_{max}/N$ is of the same order of magnitude as the accuracy obtained with the Rife and Boorstyn algorithm. This first iteration provides a first estimation $\Delta \hat{f}(i)$ of the searched frequency error. Successive iterations are subsequently performed by computing a single supplementary point at each iteration for a new error value comprised between the previously computed current estimation $\Delta \hat{f}(i)$, where i is a strictly positive iteration index, and that of two neighboring values already computed, for which the function $Z(\Delta \hat{f})$ has the largest amplitude. The result is subsequently compared with the current estimation $\Delta \hat{f}(i)$ for deriving a new estimation which is equal to the maximum value between the current estimation $\Delta \hat{f}(i)$ and the new result. The computation is thus re-iterated until the number of predetermined iterations it in accordance with equation (2) has been obtained.

In accordance with a characteristic feature of the invention, for every new packet received from a given terminal, the range $\pm \Delta f_{max}$ is fixed as a function of the error estimation $\Delta \hat{f}$ obtained for the previous packets. This measure allows a reduction or an extension of the search interval of the frequency error as a function of the real performance of the local oscillator used in each terminal.

Similarly, according to the invention, a method of frequency correction at the receiver end is characterized in that the error estimation step comprises the following sub-steps:
  a first iteration it, of the error function $Z(\Delta \hat{f})$ for 2N+1 error values comprised in a fixed range $\pm \Delta f_{max}$ dependent on said terminal for deriving a first frequency error estimation $\Delta \hat{f}1$),
  successive iterations (it$_{i+1}$, with i being a strictly positive iteration index), for values comprised between the current estimation ($\Delta \hat{f}(i)$) and a neighboring value for which the error function $Z(\Delta \hat{f})$ has the largest amplitude,
  a step of comparing the result of each iteration (it$_{i+1}$) with the current estimation ($\Delta \hat{f}(i)$) and for deriving a new estimation ($\Delta \hat{f}i+1$)) until a predetermined number of iterations (it) related to the accuracy (Acc) is obtained as defined by the relation (2).

In accordance with a preferred embodiment of the invention, suitable for the DA systems, in which the transmitted data packets comprise a preamble of known data ($c_k$), the system and the receiver are characterized in that the error estimation means comprise means for extracting data from the preamble and in that the error function $Z(\Delta \hat{f})$ is computed on the basis of these data extracted from the preamble. The use of known symbols of the preamble for estimating the frequency error at the receiver end is particularly advantageous because it renders the computation of the error function $Z(\Delta \hat{f})$ independent of the type of modulation used. The phase of the received symbols $x(k) = c_k \times e^{2\pi j \cdot k \Delta f} + \phi_0$ of the module $|c_k|$ contained in the preamble comprises information on the real error $\Delta f$. By multiplying the symbol of the received preamble $x(k)$ by the conjugated complex of the corresponding known symbol $c_k^*$, one obtains the information of the phase containing the information of the searched frequency error.

These and other aspects of the invention are apparent from and will be elucidated, by way of non-limitative example, with reference to the embodiments described hereinafter.

DETAILED DESCRIPTION OF THE INVENTION

Figure 1:
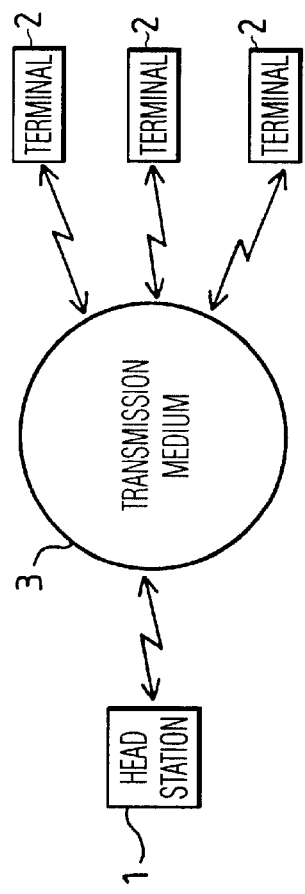
FIG. 1 shows an embodiment of the transmission system according to the invention.

A transmission system according to the invention is shown by way of example in FIG. 1. It comprises a head station 1 and a plurality of interactive terminals 2 which can transmit data to the head station by accessing a transmission medium 3. Such transmissions from terminals to the head station are qualified as ascending transmissions. In ascending transmissions, the head station 1 has the function of a receiver. The access of the terminals to the transmission medium is effected, for example, by using a frequency division multiple access mechanism combined with a time-division multiple access system. The transmission medium may be of different kinds. It may be, for example, transmission by way of a cable, by air, or by satellite.

In a frequency division multiple access system, a carrier frequency is attributed to each terminal for transmitting data to the head station. As the terminals are furnished with inaccurate local oscillators, the carrier frequency which is effectively used by a terminal has an error which may be relatively large with respect to the carrier frequency which should have been used in theory.

When the frequency division is combined with a time division, different terminals may transmit data in consecutive time intervals by using different carrier frequencies, with different frequency errors with respect to the theoretical frequencies which should have been used. The head station thus has little time for effecting the operations relating to the carrier frequency of the received signals.

The invention notably has the advantage that the frequency width between the received signal and the theoretical carrier can be estimated and corrected very rapidly. Particularly this estimation and correction may be effected for every new packet received from one of the terminals of the system. In the case of an estimation of the DA type functioning in the transmission systems where each packet comprises a preamble of known data used for realizing a series of tests, the invention only uses the data of the preamble whose sequence is known. The drawback of this DA estimation type is that the length of the preamble must be limited so as not to lose too much capacity in the passband, which implies that the error acquisition time must be maximally reduced. The advantage of the DA systems is that they allow the use of a simplified algorithm based on a comparison of symbols received with known reference symbols. The symbols received indeed comprise phase information about the error, which is easy to recuperate by multiplying the received symbol with the conjugated complex of the known symbol and by dividing the product obtained by the square value by the module of the known symbol. In this case, the used modulation type does not play a role. In contrast, for the NDA (Non-Data Aided) systems, where all the transmitted symbols are not known in advance, the invention recommends the use of a modulation of the MPSK type whose phase of the transmitted symbol is known to be about $2\pi/M$.

Figure 2:
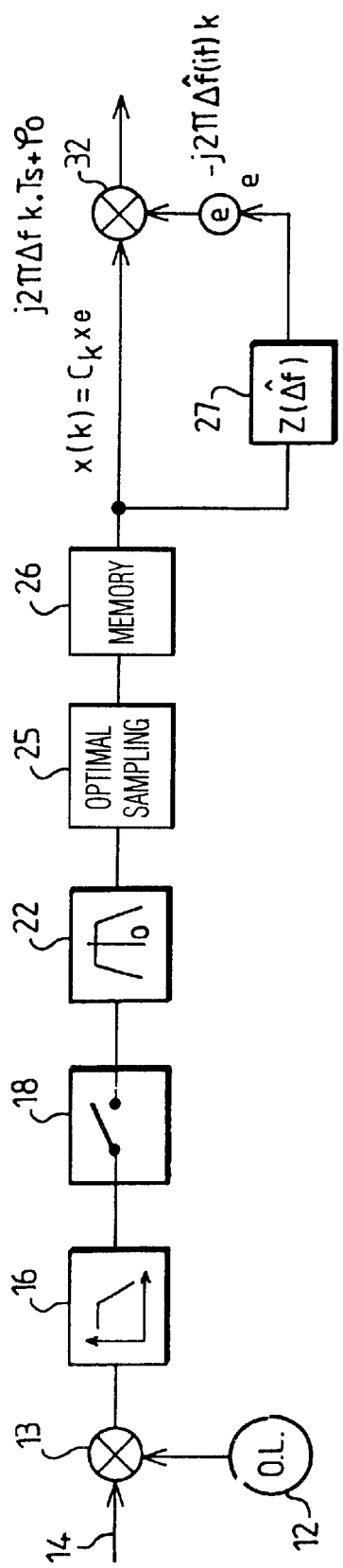
FIG. 2 shows a diagram of an embodiment of the receiver of the invention.

FIG. 2 shows a general circuit diagram of a receiver 10 according to the invention. It comprises a local oscillator 12 and a mixer 13 for transposing the received signal 14 in such a way that the spectrum of the transposed signal is centered at zero plus or minus the frequency error $\Delta f$. The transposed signal is filtered by a rejection filter 16 for eliminating the image frequencies around 2Fp where Fp is the transmission frequency, i.e. the theoretical carrier frequency of the received signal. The signal obtained at the output of the filter 16 is sampled by a sub-sampler 18 which takes N samples for each symbol of the transposed signal. The samples taken are subsequently filtered by a filter 22, referred to as optimal filter, and adapted to the filter used for the transmission. It is a low-pass filter of the Nyquist edge type centered around zero. Means 25 for searching the optimal sampling instant select a sample from N samples available at the output of the low-pass filter 22. The samples supplied by the search means 25 are stored in a memory 26 so as to be subsequently transmitted to means 27 for estimating the frequency error, on the one hand, and to correction means 32, on the other hand. In this embodiment, the temporal synchronization of each received packet is supposed to be realized before estimating the error. The estimation means 27 estimate the frequency error $\Delta f$ relative to the signal stored in the memory 26. To this end, they compute the error function $Z(\Delta \hat{f})$ in accordance with the equation (1) defined hereinafter and used in the Rife and Boorstyn algorithm as described in the article by Michele Morelli and Umberto Mengali:

$$Z(\Delta \hat{f}) = \frac{1}{L}\sum_{k=0}^{L-1} z(k) \times e^{-j2\pi k \Delta \hat{f}} \quad (1)$$

wherein L is the length of observation, i.e. the number of received symbols used for computing the estimation of the error and k represents the position of the symbol in the received frame, with $z(k)=x(k)\times c_k^*$ if the received symbols are known (DA systems), where $c_k^*$ is the conjugated complex of the known predetermined symbol $c_k$ and where $x(k)$ is the symbol received with a frequency error $\Delta f$ and is written as $x(k)=c_k \times e^{2\pi j \cdot k \Delta f \times T_s + j\phi_0}$ where $\phi_0$ is the initial phase shift between the local oscillator used at the receiver end and that used at the transmitter end (this phase shift is different for each packet and corresponds to the phase shift for k=0) and with $z(k)=e^{jM\ arg|x(k)|}$ if the received symbols are not known in advance (NDA systems) where M is the number of modulation levels, but in this case the result obtained must be divided by M for obtaining the estimation $\Delta \hat{f}$.

In accordance with the Rife and Boorstyn algorithm, the function $Z(\Delta \hat{f})$ is calculated for a large number of points comprised in the standard acquisition range $\pm\frac{1}{2}$ corresponding to the searched accuracy Acc, which is effected by means of the computation for m points (where m is an integer) comprised in the interval $\pm\frac{1}{2}$ for obtaining an accuracy which is equal to 1/m−1. Interpolation computations may be subsequently effected for improving the final accuracy of the results. For example, for obtaining an estimation $\Delta \hat{f}$ with an accuracy of $5\times10^{-4}$ by using only a fast Fourier transform for computing the function $Z(\Delta \hat{f})$, the computation must be effected for 2048 points, in which 2048 is the nearest power of 2.

The majority of terminals used in interactive transmission systems have a frequency error which is generally in a standard range denoted $\pm\Delta f_0$. Hence, the invention recommends the computation of a first iteration of the function $Z(\Delta \hat{f})$ for 2N+1 points (with 2N+1 being much less than m) comprised in a standard interval denoted $\pm\Delta f_{max}$ of, for example, 1.5%, with $\frac{1}{2}>\Delta f_0/B>\Delta f_{max}/B$ where N is an integer chosen in such a way that $\Delta f_{max}/N$ is approximately equal to $\pm 1/256$, wherein 256 is the number of points computed in the standard interval $\pm\frac{1}{2}$ for effecting a first iteration of the Rife and Boorstyn algorithm. This first iteration provides a first estimation $\Delta \hat{f}(1)$ of the searched frequency error by computing only 2N+1 points in the standard interval $\pm\Delta f_{max}$. Successive iterations are subsequently performed by computing a supplementary point at every new iteration for a new error value comprised between the previously computed current estimation $\Delta \hat{f}(i)$ with i>0 and that of two neighboring values which have already been computed and for which the function $Z(\Delta \hat{f})$ has the largest amplitude. Preferably, the computed supplementary point is the central point between the current estimation $\Delta \hat{f}(i)$ and the neighboring value for which the function $Z(\Delta \hat{f})$ has the largest amplitude. The new result obtained for the computed supplementary point is subsequently compared with the current estimation $\Delta \hat{f}(i)$ for deriving a new estimation which is equal to the maximum value between the current estimation $\Delta \hat{f}(i)$ and this new result. At every new iteration, the accuracy of the result is augmented by a factor of 2. The computation is thus re-iterated until a predetermined number of iterations it is attained, which is related to the accuracy Acc defined by the formula:

$$Acc = \frac{\Delta f_{max}}{N \times 2^{it-1}}$$

At the end of the predetermined number of iterations it, the error estimation $\Delta f(it)$ is obtained with the searched accuracy Acc.

By way of example, and by considering an error in the range $\pm\Delta f_0=\pm10^{-2}$, the invention recommends a first iteration of the computation of $Z(\Delta f)$ for 5 frequencies (N=2) in the range $\pm 1.5\times 10^{-2} (\pm\Delta f_{max}=\pm 1.5\times 10^{-2})$ and 4 supplementary iterations (it=5) for obtaining an accuracy Acc of $4.7\times 10^{-4}$ by computing $Z(\Delta \hat{f})$ for only 9 values. For obtaining the same accuracy by solely using a fast Fourier transform in accordance with the Rife and Boorstyn algorithm, the function $Z(\Delta \hat{f})$ must be computed for approximately 2048 values, which result is the nearest power of 2 of the real result.

The error estimation 66 f(it) is subsequently transmitted to exponentiation means 28 for the computation of the exponential value $e^{-2\pi j \cdot k\Delta \hat{f}(it)}$ where k is the index of the received sample stored in the memory 26. The correction means 32 have the function of correcting the frequency error relative to the signal stored in the memory 26. To this end, they receive the exponential value $e^{-2\pi j \cdot k\Delta \hat{f}(it)}$, on the one hand, and the signal $x(k)=c_k \times e^{2\pi j \cdot k\Delta f \times T_S + j\phi_0}$ stored in the memory 26, on the other hand, and effect a multiplication between the two. The obtained product corresponding to the received corrected symbol $c_k$ must then undergo a phase correction for correcting the phase error between the oscillator at the transmitter end and that at the receiver end before it is transmitted to conventional decoding means. The latter steps do not relate to the invention and are not shown in the Figure.

In accordance with a variant of an embodiment of the invention, for every new packet received from a given terminal, the range $\pm\Delta f_{max}$ is fixed as a function of the error estimation $\Delta\hat{f}$ obtained for the previous packets. This allows a reduction or an increase of the interval $\pm\Delta f_{max}$ used for computing the first iteration $it_1$ of the computation of the error function $Z(\Delta\hat{f})$ yielding the first error estimation $\Delta\hat{f}(i)$ as a function of the real performance of the local oscillator of the terminal. For example, the smaller the error or residual error estimation computed for the previous packets, i.e. the more the frequency received is nearer to the theoretical frequency, the more the range $\pm\Delta f_{max}$ may be reduced for the current packet.

Figure 3:
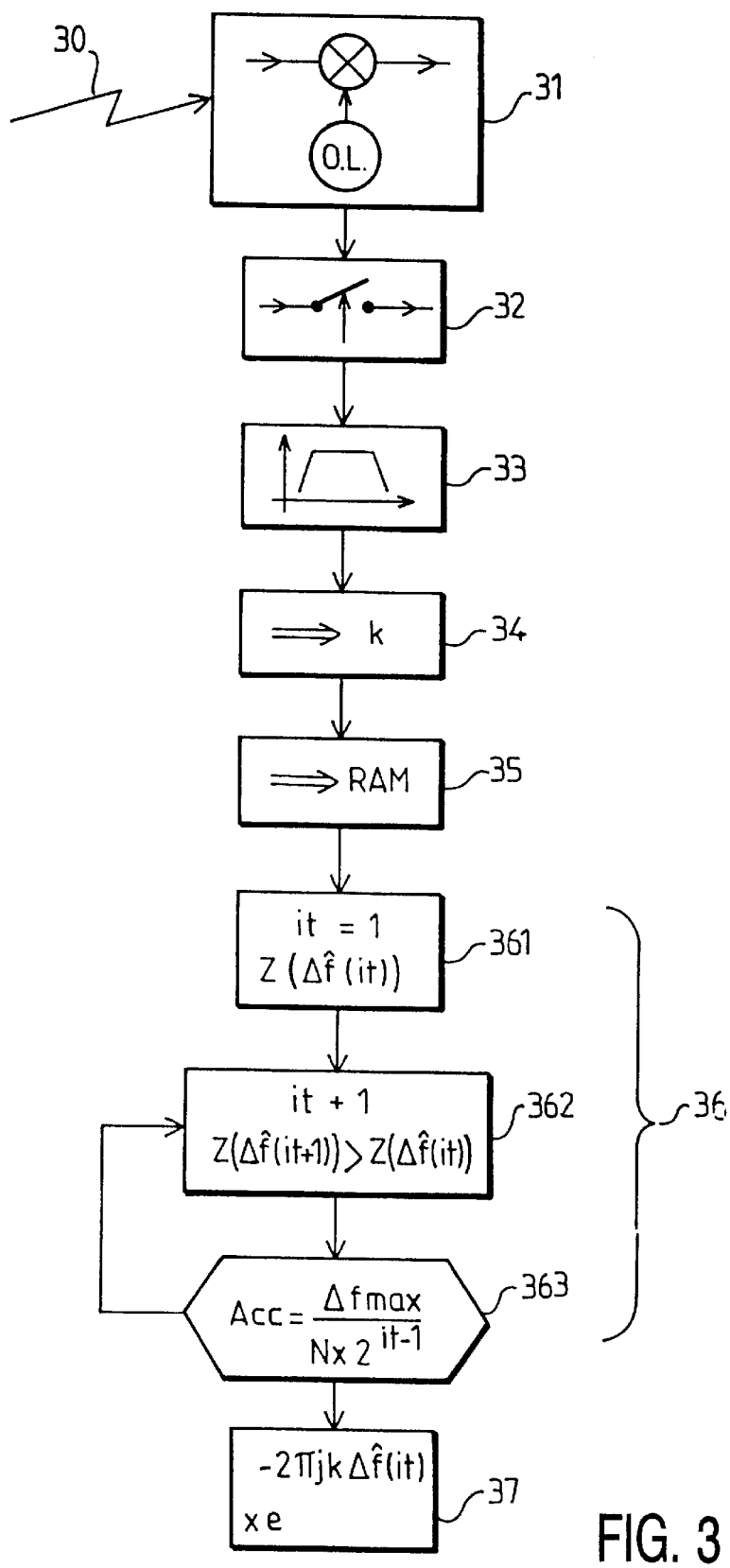
FIG. 3 shows an embodiment of the method according to the invention.

FIG. 3 shows the different steps of a frequency correction method at the receiver end according to the invention. This method comprises the following sequence of steps:

step 30: reception of the signal comprising the data packets, step 31: conversion of the received signal in the baseband, step 32: sub-sampling of the signal in the baseband, step 33: low-pass filtering by means of a Nyquist edge filter adapted to the filter used at the transmitter end, step 34: search of the optimal sample and sub-sampling, step 35: storage of the filtered signal, step 36: estimation of the frequency error $\Delta f$ relative to the signal stored during step 35:

computation, on the basis of the stored data $x(k)$, of the discrete error function $Z(\Delta\hat{f})$ defined in accordance with relation (1) for deriving the frequency error $\Delta f$ corresponding to a maximum value of the error function $Z(\Delta\hat{f})$ for a given accuracy (Acc). The error estimation step comprises the following sub-steps:

step 361: first iteration ($it_1$) of the error function $Z(\Delta\hat{f})$ for 2N+1 values in the standard range $\pm\Delta f_{max}$ for deriving a first estimation $\Delta\hat{f}(i)$ of the frequency error $\Delta f$, step 362: successive iterations ($it_{i+1}$ with i>0) for values between the current estimation $\Delta\hat{f}(i)$, i>0 and a neighboring value for which the error function $Z(\Delta\hat{f})$ has the largest amplitude, step 363: comparison of the result of each iteration $it_{i+1}$ with the current estimation $\Delta\hat{f}(i)$ for deriving a new estimation $\Delta\hat{f}(i+1)$ until a predetermined number of iterations it is attained, which is related to the accuracy Acc defined by the relation (2), step 37: frequency correction of the signal $x(k)$ stored during step 35 by multiplying it by the exponential value $e^{-2\pi j \cdot k\Delta \hat{f}(it)}$ and supplying a frequency-corrected signal.

It should be noted that the invention does not imply the transmission of a pilot signal between the transmitter and the receiver and that it thus applies to transmission systems in which the transmission of such a pilot signal is not foreseen or is not possible. The invention is usable in combination with compensation mechanisms at the transmitter end on the basis of the estimation effected by the receiver.

What is claimed is:

1. A packet transmission system comprising at least a terminal and a head station, the head station comprising means for receiving packets of data transmitted by said terminal with a frequency error $\Delta f$, and error estimation means for computing, on the basis of the received data, a discrete error function $Z(\Delta\hat{f})$ and for deriving an estimation $\Delta\hat{f}$ of the frequency error corresponding to a maximum value of the error function $Z(\Delta\hat{f})$ for a given accuracy denoted (Acc), characterized in that said error correction means comprise:

iteration means for effecting:
a first iteration ($it_1$) of the computation of the error function $Z(\Delta\hat{f})$ for 2N+1 error values comprised in a fixed standard range $\pm\Delta f_{max}$ dependent on said terminal for deriving a first frequency error estimation $\Delta\hat{f}(i)$, and successive iterations ($it_{i+1}$), with i being a strictly positive iteration index, for values comprised between a current estimation $\Delta\hat{f}(i)$ and a neighboring value for which the error function $Z(\Delta\hat{f})$ has the largest amplitude, means for comparing the result of each iteration ($it_{i+1}$) with the current estimation $\Delta\hat{f}(i)$ and for deriving a new estimation $\Delta\hat{f}(i+1)$ of the frequency error until a predetermined number of iterations, it, related to the accuracy (Acc) is obtained as defined by the relation:

$$Acc = \frac{\Delta f_{max}}{N \times 2^{it-1}}.$$

2. A system as claimed in claim 1, wherein for every new packet received from a given terminal, the range $\pm\Delta f_{max}$ is fixed as a function of the error estimation $\Delta\hat{f}$ obtained for the previous packets.

3. A system as claimed in claim 1, in which the packets of the transmitted data comprise a preamble of known data ($c_k$), characterized in that the error estimation means comprise means for extracting data $x(k)$ from the preamble of received packets and wherein the error function $Z(\Delta\hat{f})$ is computed on the basis of the data $x(k)$ extracted from the preamble.

4. A receiver for a packet transmission system intended to receive packets of data transmitted by a terminal with a frequency error $\Delta f$ and comprising error estimation means for computing, on the basis of the received data, a discrete error function $Z(\Delta\hat{f})$ and for deriving an estimation $\Delta\hat{f}$ of the frequency error corresponding to a maximum value of the error function $Z(\Delta\hat{f})$ for a given accuracy (Acc), characterized in that said error estimation means comprise:

iteration means for effecting:
a first iteration ($it_1$) of the computation of the error function $Z(\Delta\hat{f})$ for 2N+1 error values comprised in a fixed standard range $\pm\Delta f_{max}$ dependent on said terminal for deriving a first frequency error estimation $\Delta\hat{f}(i)$, and successive iterations ($it_{i+1}$), with i being a strictly positive iteration index, for values comprised between the current estimation $\Delta\hat{f}(i)$ and a neighboring value for which the error function $Z(\Delta\hat{f})$ has the largest amplitude, means for comparing the result of each iteration ($it_{i+1}$) with the current estimation $\Delta\hat{f}(i)$ and for deriving a new estimation Δfi+1) of the frequency error until a predetermined number of iterations, it, related to the accuracy (Acc) is obtained as defined by the relation:

$$Acc = \frac{\Delta f_{max}}{N \times 2^{it-1}}.$$

5. A receiver as claimed in claim 4, wherein for every new packet received from a given terminal, the range ±Δf$_{max}$ is fixed as a function of the error estimation Δf̂ obtained for the previous packets.

6. A method of frequency correction at the receiver end for a packet transmission system, comprising the steps of
a step of receiving packets of data from at least one terminal of said system,
an error estimation step for computing, on the basis of the received data, a discrete error function Z(Δf̂) and for deriving a frequency error estimation Δf̂ relative to the data received and corresponding to a maximum value of the error function Z(Δf̂) for a given accuracy (Acc), characterized in that the error estimation step comprises the following sub-steps:
a first iteration (it$_1$) of the error function Z(Δf̂) for 2N+1 error values comprised in a fixed range ±Δf$_{max}$ dependent on said terminal for deriving a first frequency error estimation Δf̂(i),
successive iterations (it$_{i+1}$), with i being a strictly positive iteration index, for values comprised between a current estimation Δf̂(i) and a neighboring value for which the error function Z(Δf̂) has the largest amplitude,
a step of comparing the result of each iteration (it$_{i+1}$) with the current estimation Δf̂(i) and for deriving a new estimation Δfi+1) of the frequency error until a predetermined number of iterations, it, related to the accuracy (Acc) is obtained as defined by the relation:

$$Acc = \frac{\Delta f_{max}}{N \times 2^{it-1}}.$$

7. A method as claimed in claim 6, wherein for every new packet received from a given terminal, the range ±Δf$_{max}$ is fixed as a function of the error estimation Δf̂ obtained for the previous packets.

* * * * *